(12) United States Patent
Wu

(10) Patent No.: US 12,549,215 B2
(45) Date of Patent: Feb. 10, 2026

(54) ELECTRONIC DEVICE WITH MICROPHONE HOUSING STRUCTURE

(71) Applicant: VIVO MOBILE COMMUNICATION CO., LTD., Guangdong (CN)

(72) Inventor: Weijing Wu, Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 226 days.

(21) Appl. No.: 18/137,618

(22) Filed: Apr. 21, 2023

(65) Prior Publication Data

US 2023/0261684 A1    Aug. 17, 2023

Related U.S. Application Data

(63) Continuation of application No. PCT/CN2021/126020, filed on Oct. 25, 2021.

(30) Foreign Application Priority Data

Oct. 28, 2020   (CN) .......................... 202011175792.8

(51) Int. Cl.
  *H04B 1/3888*    (2015.01)
  *H04M 1/02*    (2006.01)
  *H04M 1/03*    (2006.01)

(52) U.S. Cl.
  CPC ........ *H04B 1/3888* (2013.01); *H04M 1/0277* (2013.01); *H04M 1/03* (2013.01)

(58) Field of Classification Search
  CPC .... H04M 1/0277; H04M 1/03; H04B 1/3888; G06F 1/1656; G06F 1/1605; G06F 3/16

USPC .................................................... 361/679.23
  See application file for complete search history.

(56) References Cited

U.S. PATENT DOCUMENTS

| 9,101,279 B2 | 8/2015 | Ritchey et al. |
| 9,215,518 B2 | 12/2015 | Lee |
| 2014/0112518 A1 | 4/2014 | Lee |
| 2019/0004566 A1 * | 1/2019 | Lee .......................... H04M 1/03 |

(Continued)

FOREIGN PATENT DOCUMENTS

| CN | 204795204 U | 11/2015 | |
| CN | 108307285 A * | 7/2018 | ............. H04R 31/00 |
| CN | 108924320 A | 11/2018 | |

(Continued)

*Primary Examiner* — Allen L Parker
*Assistant Examiner* — Dakota M Talbert
(74) *Attorney, Agent, or Firm* — The Webb Law Firm

(57) ABSTRACT

An electronic device includes a cover plate; a circuit board, provided with a first through hole; a microphone, where a sound pickup hole of the microphone faces the first through hole; a middle frame, including a body portion for forming a sidewall of the electronic device and a connecting portion extending from the body portion into the electronic device. The connecting portion is in contact with a side of the circuit board facing away from the microphone, and is provided with a second through hole that faces the first through hole, the cover plate and the connecting portion overlap, a first channel is arranged between the cover plate and the body portion, a second channel is arranged between the cover plate and the connecting portion; and the first through hole, the second through hole, the second channel, and the first channel are in communication and form a sound guide channel.

10 Claims, 4 Drawing Sheets

(56) References Cited

U.S. PATENT DOCUMENTS

2019/0320050 A1\* 10/2019 Lim ..................... H04R 1/326
2020/0053446 A1   2/2020 Gu

FOREIGN PATENT DOCUMENTS

| | | |
|---|---|---|
| CN | 109413246 A | 3/2019 |
| CN | 210137344 U | 3/2020 |
| CN | 210137348 U | 3/2020 |
| CN | 210137422 U | 3/2020 |
| CN | 210469407 U | 5/2020 |
| CN | 210469408 U | 5/2020 |
| CN | 210518454 U | 5/2020 |
| CN | 111405413 A | 7/2020 |
| CN | 112291391 A | 1/2021 |

\* cited by examiner

ELECTRONIC DEVICE WITH MICROPHONE HOUSING STRUCTURE

CROSS-REFERENCE TO RELATED APPLICATIONS

This application is a Bypass Continuation application of International Application No. PCT/CN2021/126020, filed Oct. 25, 2021, and claims priority to Chinese Patent Application No. 202011175792.8, filed Oct. 28, 2020, which are hereby incorporated by reference in their entireties.

BACKGROUND OF THE INVENTION

Field of the Invention

This application relates to the field of communication device technologies, and in particular, to an electronic device.

Description of Related Art

Electronic devices such as smartphones and tablet computers have become indispensable products in modern life. A microphone is usually arranged in an electronic device, and the microphone can implement a sound acquisition function of the electronic device.

In the related art, the microphone is arranged in a housing of the electronic device, and a sound guide hole is provided on the housing of the electronic device. Sound information generated by a user can be transmitted to the microphone through the sound guide hole, to implement sound information interaction between the user and the electronic device.

However, in the above solution, a sound guide hole needs to be provided on the housing to transmit the sound information. In this case, the sound guide hole damages the integrity of the housing, making low appearance consistency of the electronic device and low waterproof and dustproof performance of the electronic device, resulting in low reliability of the electronic device.

SUMMARY OF THE INVENTION

This application discloses an electronic device.

According to a first aspect, embodiments of this application disclose an electronic device, including:
  a cover plate;
  a circuit board, provided with a first through hole;
  a microphone, arranged on the circuit board, where a sound pickup hole of the microphone faces the first through hole; and
  a middle frame, including a body portion for forming a sidewall of the electronic device and a connecting portion extending from the body portion into the electronic device, where the connecting portion is in contact with a side of the circuit board facing away from the microphone, the connecting portion is provided with a second through hole, the second through hole faces the first through hole, the cover plate and the connecting portion overlap, a first channel is arranged between the cover plate and the body portion, and a second channel is arranged between the cover plate and the connecting portion; and
  the first through hole, the second through hole, the second channel, and the first channel are in communication and form a sound guide channel.

REFERENCE NUMERALS

100—Cover plate, 110—Second notch;
200—First sealing member, 210—First through hole;
300—Middle frame, 310—Body portion, 320—Connecting portion, 330—Second through hole, 340—Mounting groove, 350—Counterbore;
410—First channel, 420—Second channel;
500—Microphone;
610—Support, 611—Groove, 612—Convex portion, 613—Threaded hole, 614—First portion, 615—Second portion, 620—Circuit board, 621—First through hole, 622—Third through hole;
710—Third sealing member, 711—Fourth through hole, 720—Dustproof portion, 730—Second sealing member; and
800—Threaded connecting member.

DESCRIPTION OF THE INVENTION

In order to make the objectives, technical solutions and advantages of this application clearer, the technical solutions of this application will be described clearly in combination with specific embodiments of this application and corresponding accompanying drawings. Obviously, the described embodiments are only part of the embodiments of this application and not the whole embodiments. All other embodiments obtained by a person of ordinary skill in the art based on the embodiments of this application shall fall within the protection scope of this application.

The terms "first", "second" and the like in the description and claims of the application are configured to distinguish similar objects, not to describe a specific order or precedence. It should be understood that the data in such a way are interchangeable in proper circumstances, so that the embodiments of this application can be implemented in other orders than the order illustrated or described herein. Objects distinguished by "first", "second", and the like are usually one type, and the quantity of objects is not limited. For example, there may be one or more first objects. In addition, in the specification and the claims, "and/or" means at least one of the connected objects, and the character "I" generally indicates an "or" relationship between the associated objects.

The technical solutions disclosed in the embodiments of this application are described in detail below through some embodiments and application scenarios thereof with reference to the accompanying drawings.

Figure 1:
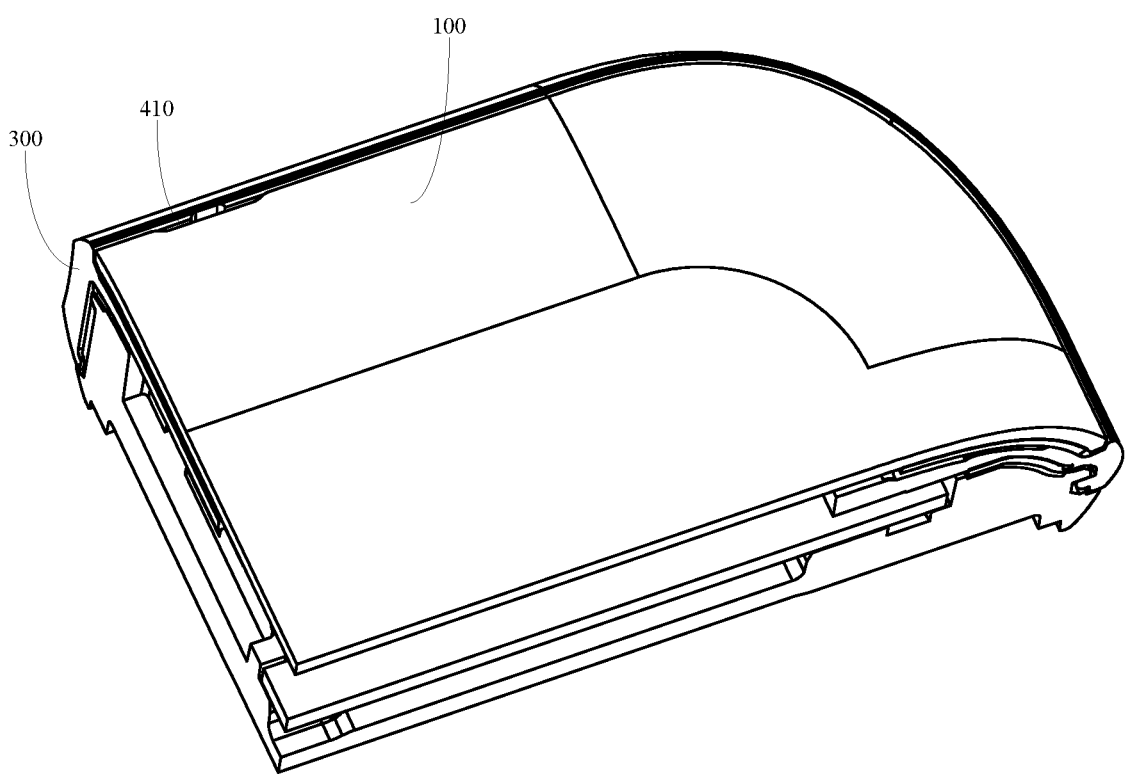
FIG. 1 is a schematic partial diagram of an electronic device according to an embodiment of this application.
Figure 2:
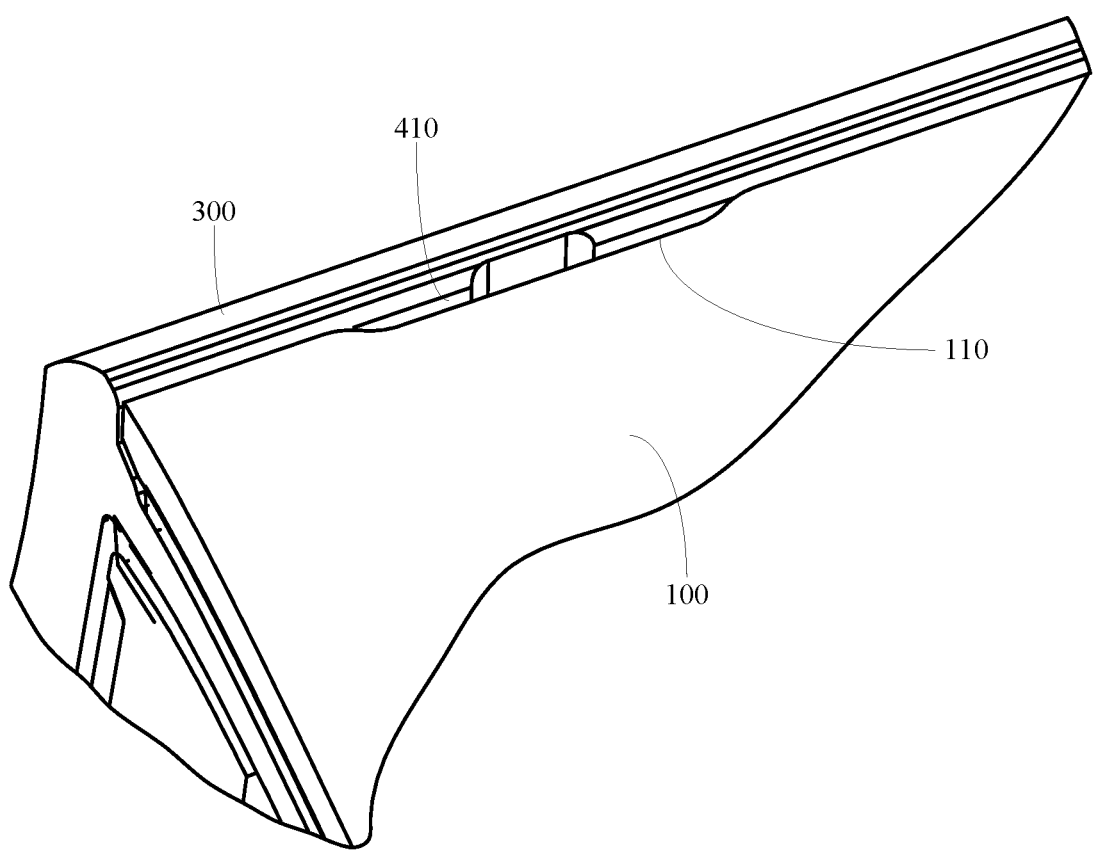
FIG. 2 is a schematic partial enlarged diagram of FIG. 1.
Figure 3:
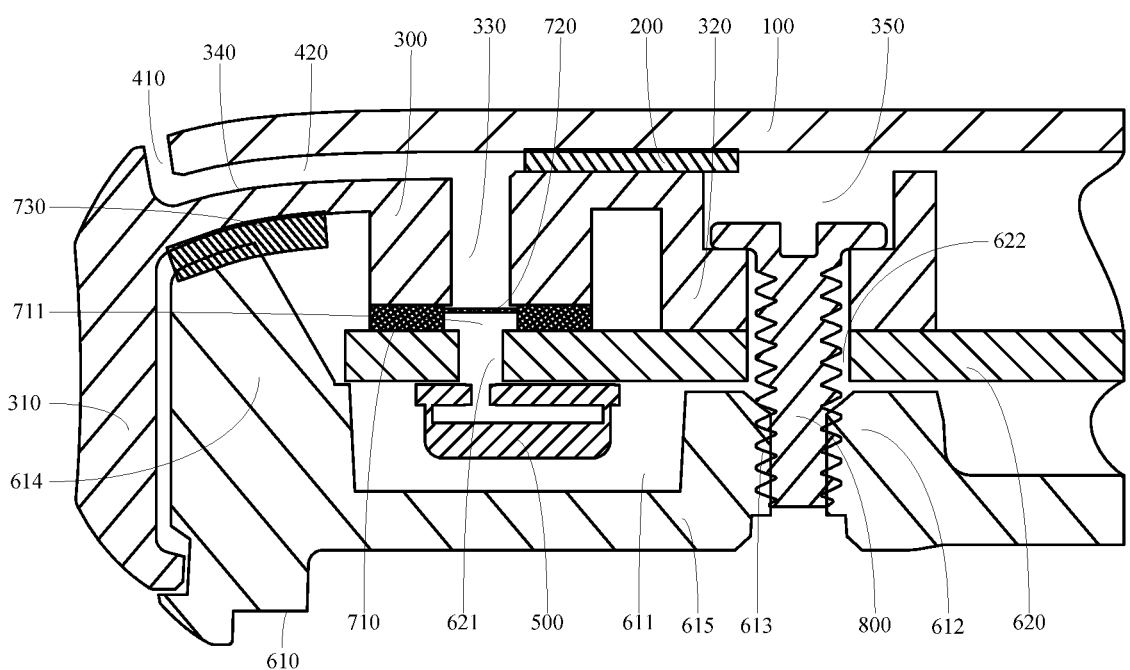
FIG. 3 is a sectional view of an electronic device according to an embodiment of this application.
Figure 4:
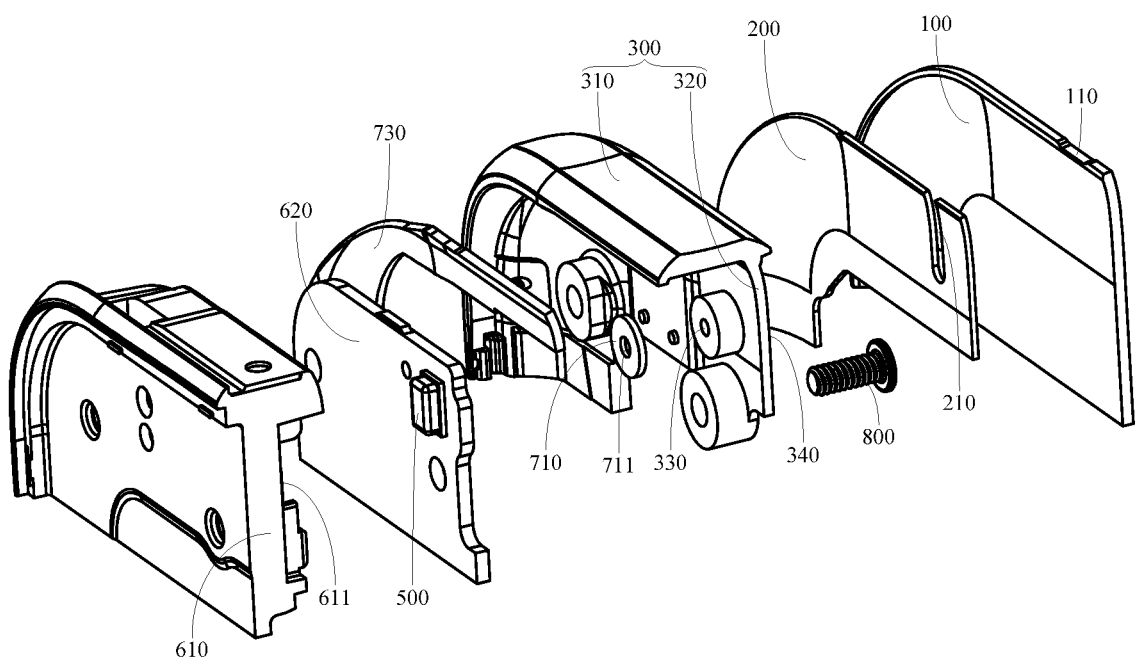
FIG. 4 is a schematic exploded view of an electronic device according to an embodiment of this application.

Referring to FIG. 1 to FIG. 4, an embodiment of this application discloses an electronic device, including a cover plate 100, a circuit board 620, a middle frame 300, and a microphone 500.

The cover plate 100 may be a rear cover, the circuit board 620 may be a main board of the electronic device, and the circuit board 620 is provided with a first through hole 621. The middle frame 300 is a basic component of the electronic device, and the middle frame 300 can provide a mounting basis for other components of the electronic device. In this embodiment of this application, the middle frame 300 includes a body portion 310 for forming a sidewall of the electronic device and a connecting portion 320 extending from the body portion 310 into the electronic device, where the connecting portion 320 is in contact with a side of the circuit board 620 facing away from the microphone 500, the connecting portion 320 is provided with a second through hole 330, the second through hole 330 faces the first through hole 621, the cover plate 100 and the connecting portion 320 overlap, a first channel 410 is arranged between the cover plate 100 and the body portion 310, a second channel 420 is arranged between the cover plate and the connecting portion 320, and the first through hole 621, the second through hole 330, the second channel 420, and the first channel 410 are in communication and form a sound guide channel.

Optionally, the cover plate may also be a screen cover plate, and the screen cover plate may be an OLED screen cover plate or an LCD screen cover plate.

It is not easy for a user to see the sound guide channel, which makes high appearance integrity and consistency of the electronic device. One port of the first channel 410 is exposed on an external surface of the electronic device, that is, the first channel 410 is in communication with an external part of the electronic device, and the first channel 410 may be used for sound guide of the electronic device. Optionally, the first channel 410 may be in an elongated strip shape, which can reduce a width of the first channel 410, thereby making the first channel 410 more hidden. An extension direction of the first channel 410 is a length direction of the first channel 410. In this case, an area of the first channel 410 can be increased by increasing a length of the first channel 410, to meet the sound guide requirement of the microphone 500. Optionally, the shape and structure of the first channel 410 may be determined by the shape and structure of the cover plate 100 and the middle frame 300.

In the electronic device disclosed in this embodiment of this application, the middle frame 300 includes a body portion 310 for forming a sidewall of the electronic device and a connecting portion 320 extending from the body portion 310 into the electronic device, where the connecting portion 320 is in contact with a side of the circuit board 620 facing away from the microphone 500, the connecting portion 320 is provided with a second through hole 330, the second through hole 330 faces the first through hole 621, the cover plate 100 and the connecting portion 320 overlap, a first channel 410 is arranged between the cover plate 100 and the body portion 310, a second channel 420 is arranged between the cover plate and the connecting portion 320, and the first through hole 621, the second through hole 330, the second channel 420, and the first channel 410 are in communication and form a sound guide channel. In this case, the first channel between the cover plate 100 and the middle frame 300 can be used to transmit sound, so that there is no need to provide a sound guide hole on the middle frame 300, reducing the quantity of holes on the middle frame 300, thereby improving the integrity and appearance consistency of the middle frame 300, promoting the appearance consistency of the electronic device, and improving user experience. In addition, the first channel 410 is narrower than the sound guide hole, so that moisture or dust in the environment can be effectively prevented from entering the electronic device, thereby improving the waterproof and dustproof performance of the electronic device, and improving the reliability of the electronic device.

In addition, the first channel between the cover plate 100 and the middle frame 300 is used to transmit sound information, and there is no need to process a sound guide hole on the middle frame 300 additionally, thereby optimizing the processing process of the middle frame 300, so that the processing steps of the middle frame 300 are simplified, thereby improving the manufacturability of the middle frame 300, and reducing the manufacturing cost of the electronic device.

As described above, the cover plate 100 and the connecting portion 320 overlap. In order to prevent external impurities (such as dust and moisture) from entering the electronic device through a gap between the cover plate 100 and the connecting portion 320, optionally, the electronic device may further include a first sealing member 200, and the first sealing member 200 is arranged between the cover plate 100 and the connecting portion 320; and the second channel 420 is arranged between the cover plate 100, the connecting portion 320, and the first sealing member 200. The first sealing member 200 can block dust and moisture from entering the electronic device to a large extent, thereby preventing the microphone 500 from being easily eroded by dust or moisture, to protect the microphone 500, and prevent dust or moisture from corroding the electronic components inside the electronic device, thereby further improving the reliability of the electronic device.

In order to further improve the hidden nature of the first channel 410, so that the first channel 410 is more difficult to be found, optionally, the connecting portion 320 may be provided with a mounting groove 340, at least a portion of the cover plate 100 is arranged in the mounting groove 340, the second through hole 330 is provided at a bottom of the mounting groove 340, and the first sealing member 200, the cover plate 100, and the mounting groove form the second channel 420. In this case, the cover plate 100 and an inner sidewall of the mounting groove 340 can form the first channel 410. Compared with the cover plate 100 being arranged on the connecting portion 320 without the mounting groove 340, the first channel 410 is more easily formed in this arrangement mode. Since the cover plate 100 and the inner sidewall of the mounting groove 340 form the first channel 410, which makes the first channel 410 more hidden, it is more difficult for the user to find the first channel 410, thereby making higher appearance integrity and consistency of the electronic device. In addition, at least a portion of the cover plate 100 is arranged in the mounting groove 340, which can reduce a thickness of the electronic device and facilitate the lightweight development of the electronic device.

Optionally, the first sealing member 200 may be provided with a fifth through hole 210, and the fifth through hole 210 is in communication with the second channel, that is, a bore diameter of the fifth through hole is greater than or equal to a length of the second channel. This method is simple, reliable, and easy to operate, which is conducive to reducing the sound leakage of the electronic device.

The cover plate 100 may be clamped to the middle frame 300 or in threaded connection to the middle frame 300. Optionally, the first sealing member 200 may include a foam adhesive layer, and the cover plate 100 may be bonded to the connecting portion 320 through the foam adhesive layer. The bonding method is simple and easy to operate, and the bonded cover plate 100 and connecting portion 320 are in reliable connection. In addition, the foam adhesive layer can make better sealing of the second channel 420, prevent sound transmission from the gap between the cover plate 100 and the connecting portion 320, and avoid large sound loss, so that more sound can be transmitted through the first channel 410, to avoid the sound leakage of the electronic device, and avoid weak sound picked up by the microphone 500, thereby making better sound characteristics of the electronic device.

In an optional embodiment, an edge of a side at which the cover plate 100 fits the body portion 310 may be provided with a second notch 110, and the second notch 110 forms the first channel 410. Part of the material is removed from the edge of the side at which the cover plate 100 fits the body portion 310, so that the first channel 410 between the cover plate 100 and the body portion 310 is larger, thereby increasing the area of the first channel 410, so that the first channel 410 can transmit more sound, thereby further improving the sound characteristics of the electronic device.

Certainly, alternatively, the edge of the side at which the body portion 310 fits the cover plate 100 may be provided with a third notch, and the third notch forms the first channel 410. This solution can also increase the area of the first channel 410, so that the first channel 410 can transmit more sound, thereby further improving the sound characteristics of the electronic device. Optionally, the second notch 110 and the third notch may be in an elongated strip shape, or certainly, in other shapes. This is not limited in this embodiment of this application.

In an optional embodiment, the electronic device may further include a support 610, the support 610 has a first portion 614 and a second portion 615 that are connected to each other, the first portion 614 abuts against the connecting portion 320, the second portion 615 is arranged at a side of the circuit board 620 with the microphone 500, the second portion 615 is provided with a groove 611, and at least a portion of the microphone 500 is arranged in the groove 611. The groove 611 and the circuit board 620 may form an accommodation space, the microphone 500 is electrically connected to the circuit board 620 and may be located in the accommodation space, the circuit board 620 is located between the second portion 615 and the middle frame 300, and the circuit board 620 is provided with a first through hole 621, so that the accommodation space may be in communication with the second through hole 310 through the first through hole 621. The accommodation space can provide an independent sound cavity for the microphone 500, so that the microphone 500 can work well. For example, the accommodation space can also protect the microphone 500, and prevent the microphone 500 from being easily eroded by dust or moisture, thereby improving the reliability of the microphone 500.

In order to prevent dust or moisture from entering the electronic device, in an optional embodiment, the electronic device may further include a second sealing member 730, and the first portion 614 abuts against the connecting portion 320 through the second sealing member 730. The second sealing member 730 can seal a gap between the first portion 614 and the middle frame 300 to prevent dust or moisture from entering the electronic device through the gap between the first portion 614 and the middle frame 300, thereby preventing dust and moisture from damaging the electronic components of the electronic device, further improving the reliability of the electronic device. Optionally, the second sealing member 730 may be made of a material such as silicone and rubber.

In some embodiments, the support 610 may be an upper cover of the main board of the electronic device, that is, a screen support, or certainly a separate support for forming the accommodation space; and the circuit board 620 may be a main board or a sub-board of the electronic device, or certainly a separate circuit board for arranging the microphone 500 in the electronic device. The support 610 and the circuit board 620 are not limited in this embodiment of this application.

In order to further protect the microphone 500, in an optional embodiment, a third sealing member 710 is arranged between the middle frame 300 and the circuit board 620, the third sealing member 710 is provided with a fourth through hole 711, the fourth through hole 711 is opposite to the first through hole 621, and the second through hole 330 is in communication with the first through hole 621 through the fourth through hole 711. The third sealing member 710 can block dust and moisture from entering the accommodation space to a large extent, thereby preventing the microphone 500 from being easily eroded by dust or moisture, further protecting the microphone 500. In addition, the fourth through hole 711 makes the third sealing member 710 not affect the sound transmission, to ensure that the electronic device can make sound and pick up sound normally. Optionally, the third sealing member 710 may be made of a material such as silicone and rubber.

Optionally, the second portion 615, the circuit board 620, and the connecting portion 320 may be fixedly connected through a threaded connecting member 800. This connection method has high connection stability, which can make reliable connection between the support 610, the circuit board 620, and the middle frame 300, and avoid loosening of the middle frame 300 from the circuit board 620, thereby avoiding failure of the sealing effect of the third sealing member 710, further improving the sealing reliability of the third sealing member 710. The threaded connecting member 800 may be a bolt or a screw.

Optionally, the second portion 615 may be provided with a convex portion 612, the convex portion 612 can form a portion of a sidewall of the groove 611, and the threaded connecting member 800 may be connected to the convex portion 612 to make a connection position of the threaded connecting member 800 close to the third sealing member 710, so that the middle frame 300 close to the third sealing member 710 can be locked to the circuit board 620 to further improve the sealing reliability of the third sealing member 710. The connection position of the threaded connecting member 800 is close to the third sealing member 710, that is, a distance between the threaded connecting member 800 and the third sealing member 710 cannot exceed a preset distance. The preset distance may be 1 cm or 1.5 cm. The preset distance may be determined according to a size of the electronic device and a structure of the middle frame 300. The preset distance is not specifically limited in this embodiment of this application.

In some embodiments, the middle frame 300 may be provided with a counterbore 350, the circuit board 620 may be provided with a third through hole 622, the convex portion 612 may be provided with a threaded hole 613, one end of the threaded connecting member 800 passes through the counterbore 350 and the third through hole 622 to be in thread fit with the threaded hole 613, and another end of the threaded connecting member 800 is pressed in the counterbore 350. In this case, the threaded connecting member 800 is difficult to affect the stacking of other components inside the electronic device, which is convenient for the staff to arrange, and the threaded connecting member 800 does not increase the thickness of the electronic device.

In an optional embodiment, a dustproof portion 720 is arranged between the second through hole 330 and the fourth through hole 711 to prevent dust from entering the accommodation space through the sound guide channel of the microphone 500, thereby preventing the microphone 500 from being easily eroded by dust or moisture, further improving the reliability of the microphone 500. It should be noted that, the first through hole 621, the second through hole 330, the second channel 420, and the first channel 410 are in communication and form the sound guide channel of the microphone 500. In addition, the dustproof portion 720 may be sandwiched between the third sealing member 710 and the middle frame 300, so that there is no need to arrange components for mounting the dustproof portion 720 on the middle frame 300, thereby making a simple and convenient mounting operation of the dustproof portion 720. The dustproof portion 720 may be a dustproof net.

The electronic device disclosed in the embodiments of this application can be an intelligent mobile phone, a tablet computer, an e-book reader, a wearable device (such as a smart watch), an electronic game console and other devices, and the embodiments of this application do not limit specific types of the electronic device.

In the above embodiments of the application, the differences between embodiments are mainly described. As long as the different optimization features between embodiments are not contradictory, they can be combined to form better embodiments. Considering the conciseness of the writing, no repeated description is provided.

The above are only embodiments of this application and are not intended to limit this application. For a person skilled in the art, various modifications and changes can be made to the present application. Any modification, equivalent replacement, or improvement made application spirit and principle of the present application shall fall within the scope of the claims of the present application.

What is claimed is:

1. An electronic device, comprising:
   a cover plate;
   a circuit board, provided with a first through hole;
   a microphone, arranged on the circuit board, wherein a sound pickup hole of the microphone faces the first through hole; and
   a middle frame, comprising a body portion for forming a sidewall of the electronic device and a connecting portion extending from the body portion into the electronic device, wherein the connecting portion is in contact with a side of the circuit board facing away from the microphone, the connecting portion is provided with a second through hole, the second through hole penetrates through the connecting portion from a side of the connecting portion near the circuit board to a side of the connecting portion near the cover plate, the cover plate and the connecting portion overlap on a side of the connecting portion away from the circuit board, a first channel is formed between the cover plate and the body portion, and one port of the first channel is exposed on an external surface of the electronic device; and
   the first through hole, the second through hole, the second channel, and the first channel are in communication and form a sound guide channel; wherein
   the electronic device further comprises a first sealing member, and the first sealing member is arranged between the cover plate and the connecting portion; and the second channel is formed between the cover plate, the connecting portion, and the first sealing member;
   wherein the first sealing member is provided with a fifth through hole, and the fifth through hole is in communication with the second channel.

2. The electronic device according to claim 1, wherein the connecting portion is provided with a mounting groove, at least a portion of the cover plate is arranged in the mounting groove, the second through hole is provided at a bottom of the mounting groove, and the first sealing member, the cover plate, and the mounting groove form the second channel.

3. The electronic device according to claim 1, wherein the first sealing member comprises a foam adhesive layer, and the cover plate is bonded to the connecting portion through the foam adhesive layer.

4. The electronic device according to claim 1, wherein the electronic device further comprises a support, the support has a first portion and a second portion that are connected to each other, the first portion abuts against the connecting portion, the second portion is arranged at a side of the circuit board with the microphone, the second portion is provided with a groove, and at least a portion of the microphone is arranged in the groove.

5. The electronic device according to claim 4, wherein the electronic device further comprises a second sealing member, and the first portion abuts against the connecting portion through the second sealing member.

6. The electronic device according to claim 4, wherein the second portion, the circuit board, and the connecting portion are connected through a threaded connecting member.

7. The electronic device according to claim 6, wherein the second portion is provided with a convex portion, the convex portion forms a portion of a sidewall of the groove, and the threaded connecting member is connected to the convex portion.

8. The electronic device according to claim 7, wherein the middle frame is provided with a counterbore, the circuit board is provided with a third through hole, the convex portion is provided with a threaded hole, one end of the threaded connecting member passes through the counterbore and the third through hole to be in thread fit with the threaded hole, and another end of the threaded connecting member is pressed in the counterbore.

9. The electronic device according to claim 4, wherein a third sealing member is arranged between the middle frame and the circuit board, the third sealing member is provided with a fourth through hole, the fourth through hole is opposite to the first through hole, and the second through hole is in communication with the first through hole through the fourth through hole.

10. The electronic device according to claim 9, wherein a dustproof portion is arranged between the second through hole and the fourth through hole.

* * * * *